(12) United States Patent
Di Trapani et al.

(10) Patent No.: US 10,684,399 B2
(45) Date of Patent: Jun. 16, 2020

(54) CHROMATIC FACADE AND WINDOW UNITS

(71) Applicant: COELUX S.R.L., Lomazzo (CO) (IT)

(72) Inventors: Paolo Di Trapani, Cavallasca (IT); Davide Magatti, Capiago Intimiano (IT)

(73) Assignee: CoeLux S.r.l., Lomazzo (CO) (IT)

( * ) Notice: Subject to any disclaimer, the term of this patent is extended or adjusted under 35 U.S.C. 154(b) by 0 days.

(21) Appl. No.: 15/742,807

(22) PCT Filed: Jul. 15, 2016

(86) PCT No.: PCT/EP2016/066995
§ 371 (c)(1),
(2) Date: Jan. 8, 2018

(87) PCT Pub. No.: WO2017/009478
PCT Pub. Date: Jan. 19, 2017

(65) Prior Publication Data
US 2019/0079220 A1    Mar. 14, 2019

(30) Foreign Application Priority Data

Jul. 15, 2015   (WO) ................ PCT/EP2015/001454

(51) Int. Cl.
*G02B 5/02* (2006.01)
*E04F 13/077* (2006.01)
(Continued)

(52) U.S. Cl.
CPC ........ *G02B 5/0284* (2013.01); *B32B 17/1022* (2013.01); *C03C 17/06* (2013.01);
(Continued)

(58) Field of Classification Search
CPC .. G02B 5/0284; G02B 5/0242; G02B 5/0808; C03C 17/06; C03C 17/34
See application file for complete search history.

(56) References Cited

U.S. PATENT DOCUMENTS 8,068,285 B1    11/2011   Flynn
2011/0010994 A1  1/2011   Wilson et al.
(Continued)

FOREIGN PATENT DOCUMENTS

EP    1635200 A1    3/2006
EP    1919000 A1    5/2008
(Continued)

OTHER PUBLICATIONS

Friedhelm Fensterseifer, "Reflection Haze," BYK-Gardner Catalog, 2010/2011, pp. 27-28 (2 total pages).
(Continued)

*Primary Examiner* — William C. Dowling
(74) *Attorney, Agent, or Firm* — DiBerardino McGovern IP Group LLC

(57) ABSTRACT

In an aspect, a chromatic facade unit for being attached to a wall (1A) of a building (1) is disclosed that can form a facade (3) of the wall (1A). The chromatic facade unit (11) comprises a support structure (15), a chromatic reflective layer (17) formed on the support structure (15), the chromatic reflective layer (17) comprising reflective layer (43) and a chromatic diffusing layer (41), wherein the chromatic diffusing layer (41) is configured to provide for a specular reflectance that is larger in the red than in the blue and for a diffuse reflectance that is larger in the blue than in the red, and the reflective layer (43) is configured to reflect visible light having passed through the chromatic diffusing layer (41). The chromatic facade unit (11) comprises further an absorbing medium (47) provided in or on the chromatic diffusing layer (41) and/or the reflective layer (43), wherein
(Continued)

the absorbing medium (47) is configured to absorb preferred radiation in the infrared spectrum and less in the visible spectrum. Furthermore, respective chromatic window units are disclosed to comprise a chromatic diffusing layer (41) and an absorbing medium (47).

29 Claims, 4 Drawing Sheets

(51) Int. Cl.
| | |
|---|---|
| *B32B 17/10* | (2006.01) |
| *C03C 17/34* | (2006.01) |
| *C03C 17/06* | (2006.01) |
| *G02B 5/08* | (2006.01) |
| *F21V 7/00* | (2006.01) |
| *F21V 7/04* | (2006.01) |
| *F21V 9/02* | (2018.01) |
| *G02B 5/10* | (2006.01) |

(52) U.S. Cl.
CPC ............ *C03C 17/34* (2013.01); *E04F 13/077* (2013.01); *F21V 7/0008* (2013.01); *F21V 7/04* (2013.01); *F21V 9/02* (2013.01); *G02B 5/0242* (2013.01); *G02B 5/0808* (2013.01); *G02B 5/10* (2013.01); *B32B 2307/416* (2013.01); *C03C 2217/252* (2013.01); *C03C 2217/445* (2013.01); *C03C 2217/452* (2013.01); *C03C 2217/48* (2013.01); *C03C 2217/72* (2013.01)

(56) References Cited

U.S. PATENT DOCUMENTS

| | | | |
|---|---|---|---|
| 2011/0216414 | A1 | 9/2011 | Suzuki et al. |
| 2012/0147458 | A1 | 6/2012 | Selles et al. |
| 2014/0104690 | A1 | 4/2014 | Sandre-Chardonnal |
| 2014/0118815 | A1 | 5/2014 | Cho |
| 2014/0335364 | A1 | 11/2014 | Fujita et al. |
| 2016/0363777 | A1 | 12/2016 | Flynn et al. |
| 2017/0074486 | A1 | 3/2017 | Flynn et al. |
| 2018/0203165 | A1* | 7/2018 | Di Trapani .......... G02B 5/0242 |
| 2018/0210120 | A1* | 7/2018 | Di Trapani .......... G02B 5/0221 |
| 2019/0178471 | A1* | 6/2019 | Di Trapani .......... F21V 7/0008 |

FOREIGN PATENT DOCUMENTS

| | | |
|---|---|---|
| EP | 2202454 A2 | 6/2010 |
| EP | 2221349 A1 | 8/2010 |
| EP | 2786972 A1 | 10/2014 |
| EP | 2873709 A1 | 5/2015 |
| GB | 2450192 C | 6/2009 |
| JP | S57-121901 U | 7/1982 |
| JP | S57-133011 U | 8/1982 |
| JP | 2000-122580 A | 4/2000 |
| JP | 2001-141912 A | 5/2001 |
| JP | 2002-107513 A | 4/2002 |
| JP | 2002-207446 A | 7/2002 |
| JP | 2007-009473 A | 1/2007 |
| JP | 2011-203716 A | 10/2011 |
| JP | 2013-043390 A | 3/2013 |
| JP | 2014-012945 A | 1/2014 |
| KR | 10-1493027 B1 | 2/2015 |
| WO | 2009/156347 A1 | 12/2009 |
| WO | 2009/156348 A1 | 12/2009 |
| WO | 2012/054318 A1 | 4/2012 |
| WO | 2012/104547 A1 | 8/2012 |
| WO | 2013/011481 A2 | 1/2013 |
| WO | 2013/080859 A1 | 6/2013 |
| WO | 2014/058748 A1 | 4/2014 |
| WO | 2014/076656 A1 | 5/2014 |
| WO | 2014/178837 A1 | 11/2014 |
| WO | 2014/191250 A1 | 12/2014 |
| WO | 2015/036057 A1 | 3/2015 |
| WO | 2015/172794 A1 | 11/2015 |
| WO | 2015/172821 A1 | 11/2015 |
| WO | 2016/134732 A1 | 9/2016 |
| WO | 2016/134733 A1 | 9/2016 |
| WO | 2017/008821 A1 | 1/2017 |
| WO | 2017/085079 A1 | 5/2017 |

OTHER PUBLICATIONS

T.C. Grenfell et al., "Representation of a non-spherical ice particle by a collection of independent spheres for scattering and absorption of radiation," Journal of Geophysical Research, vol. 104, No. D24, pp. 31,697-31,709 (13 total pages), Dec. 27, 1999.

Standard Terminology of Appearance, ASTM International, Designation: E284-09a, downloaded Feb. 2012, pp. 1-23 (23 total pages).

Charlotte Albayrak, European International Searching Authority, International Search Report and Written Opinion, counterpart PCT Application No. PCT/EP2016/066995, dated Mar. 21, 2017, 14 pages total.

Office Action, Japanese Patent Application No. 2018-501978 dated Oct. 2, 2018, 17 pages total (including English translation of 9 pages).

* cited by examiner

CHROMATIC FACADE AND WINDOW UNITS

TECHNICAL FIELD

The present disclosure relates generally to a facade of a building and in particular to nanoparticle based light affecting facade units that may be applied in facade structures of buildings to provide for a desired optical and visual effect.

BACKGROUND

As disclosed in the international patent application PCT/EP2015/001454, filed on 15 Jul. 2015 by the same applicants, which is incorporated herein by reference, facade units may be used to provide for a specific visual perception of an outdoor wall of a building for an observer. In particular, those facade units may provide specific chromatic and reflective features that provide for properties of sun imitating reflection such as described, for example, in WO 2015/172821 A1 by the same applicants.

For example, in modern architecture, facade structures combine a large variety of functions. Primarily, there is the aesthetic aspect addressing the perception of a building and how it is perceived in the environment of other buildings, under different weather conditions, and respective illumination situations. Furthermore, active illumination of buildings allows providing specific visual impressions of buildings even at night.

On Rayleigh-like diffusing layers, several applications such as EP 2 30 478 A1, EP 2 304 480 A1. WO 2014/076656 A1, and WO 2015/172821 A1 filed by the same applicants, disclose lighting systems that use a light source producing visible light, and a panel containing nanoparticles used in transmission or reflection. During operation of those lighting systems, the panel receives the light from the light source and acts as a so-called Rayleigh diffuser, namely it diffuses incident light similarly to the earth atmosphere in clear-sky conditions. Specifically, the concepts refer to directional light with lower correlated color temperature (CCT), which corresponds to sunlight, and diffuse light with larger CCT, which corresponds to the light of the blue sky.

Introducing a reflective chromatic feature in a facade of a building as proposed, for example, in the international patent application PCT/EP2015/001454 mentioned above will redirect sun light towards the ground at the bottom of the building.

Thus, the present disclosure is directed, at least in part, to improving or overcoming one or more aspects of prior systems.

SUMMARY OF THE DISCLOSURE

In a first aspect, the present disclosure is directed to a chromatic facade unit for being attached to a wall of a building to form a facade of the wall (in particular based on a plurality of identical or similar chromatic facade units. The chromatic facade unit comprises a support structure, and a chromatic reflective layer formed on the support structure. The chromatic reflective layer comprises a reflective layer and a chromatic diffusing layer, wherein the chromatic diffusing layer is configured to provide for a specular reflectance that is larger in the red than in the blue and for a diffuse reflectance that is larger in the blue than in the red. The reflective layer is configured to reflect visible light having passed through the chromatic diffusing layer. The chromatic facade unit comprises further an absorbing medium provided in or on the chromatic diffusing layer and/or the reflective layer.

The absorbing medium used herein for NIR absorption is configured to absorb radiation in the infrared spectral range, while essentially transmitting the visible spectral range. For example, the absorbing medium absorbs selectively NIR radiation, i.e. the absorption with respect to radiation in the infrared spectral range is larger than with respect to the visible spectral range. The absorbing medium is configured to absorb preferred radiation in the infrared spectrum, and less in the visible spectrum In another aspect, a chromatic facade unit for attaching to a wall of a building comprises a support structure, a reflective layer formed on the support structure, and a chromatic diffusing layer having a back side provided at the reflective layer and a front side for being illuminated by incident light. The chromatic diffusing layer comprises a plurality of nanoparticles embedded in a matrix, and is configured to provide for a specular reflectance that is larger in the red than in the blue and for a diffuse reflectance that is larger in the blue than in the red, wherein the chromatic diffusing layer and/or the reflective layer further comprises particles contributing to absorption of a spectral range in the infrared spectrum.

In another aspect, a chromatic facade structural unit comprises a chromatic facade unit as disclosed herein, and a mounting system configured for mounting the chromatic facade unit to the wall such that the chromatic facade unit extends vertically at a distance along the wall, thereby forming the chimney system extending vertically between the wall and the chromatic facade unit.

In another aspect, a building comprises a wall, and a facade comprising a plurality of chromatic facade units as disclosed herein attached to the wall such as the chromatic facade structural unit, and wherein the facade is mounted in particular at least to a top portion of the wall, to an intermediate portion of the wall, or to portions of the wall that are selected to modify the perceived shape of the building.

Other aspects include chromatic reflective structural units for attaching to a wall of a building, buildings with a wall and a facade structure attached to the wall based on chromatic reflective structural units as disclosed herein, and illumination systems using chromatic reflective units as disclosed herein. In addition, aspects relate to a method for providing an outside portion of a building with the visual appearance from an observer area on the ground that is similar to an appearance of the real sky, in particular by using chromatic reflective units as disclosed herein.

In another aspect, a chromatic window unit is provided for integration in a wall of a building or mounting onto a reflective façade portion of a building. The chromatic window unit is in particular designed for being exposed to outside light such as sun light. The chromatic window unit comprises a support structure, and a chromatic diffusing layer. The chromatic diffusing layer is based on nanoparticle-based Rayleigh-like diffusing by nanoparticles which preferentially scatters short-wavelength components of incident light with respect to long-wavelength components of incident light. The chromatic window unit comprises further an absorbing medium provided in or on the chromatic diffusing layer, wherein the absorbing medium is configured to absorb radiation in the infrared spectrum and/or the visible spectrum.

Further embodiments of the above aspects, are disclosed in the claims, which are incorporated herein by reference.

Different optical properties for the visible wavelength spectrum and the infrared wavelength spectrum can be achieved by providing Rayleigh-like (essentially visible light non-absorbing) scattering particles being active in the visible spectrum and a material that is (primarily) absorbing in the infrared spectrum but essentially not affecting the visible spectrum.

Examples of Near Infrared (NIR) absorbing materials include NIR dyes that selectively absorb in the near infrared range from about 700 nm to about 2500 nm. Most NIR absorbing materials are organic compounds. However, there are also several types of inorganic metal based oxides that may be used to selectively absorb NIR light. Those materials may essentially not be active in the visible spectral range. At present a large library of standard NIR absorbing dyes ranging from narrow notch to broad band absorbers that can attenuate selective near infrared wavelength regions are available. Those NIR dyes can be used singly or in combinations to create custom spectral filters for multiple applications. In a common application NIR dyes are selected based on their compatibility behavior with respective solvents, paints, inks, and/or respective plastic matrix. The matrix incorporating the absorber strongly influences the selection of the absorber.

Furthermore, organic NIR absorbing materials are basically as (a) organic conjugated or donor acceptor system, and (b) metal complex.

In case (a) organic conjugated or donor acceptor system, the NIR absorption is obtained by changing the extent of p conjugation (i.e. Polymethines, cyanine). Furthermore, when donor/acceptor groups are present the donation or withdrawing strength is able to influence the energy level and thus the absorptive properties (i.e. polyenes, Quinone derivatives, phtalocyanine and naphthalocyanines and other azo compounds).

A commercial example of an NIR absorber is Lumogen® IR 1050 produced from BASF, belonging to polymethines chemical group. Lumogen® IR 1050 and 1050 PC are commonly used in transparent applications such as acrylic or polycarbonate sheeting or coating used for windows, and automotive window films. This technology exploits the absorption of NIR radiation on the outside of the building or automobile and releasing the heat outside thereby reducing the interior temperature, while being transparent for visible light. Additional, there are NIR absorbers produced from the same company such as Lumogen 765 and Lumogen 788 having an absorption maximum at 765 and 788 nm, respectively. Similar to the schematic examples shown in FIG. 7, those absorbers may be characterized by a narrow absorption peak with respect to Lumogen IR 1050 and thus may be used together with other NIR absorber in order to cover the whole range and capture a greater extend of NIR radiation.

In case (b) metal complex, the NIR absorption generally originates from a charge transfer mechanism from ligand to metal or vice versa (LMCT or MLCT). Dyes with a metal center of aluminum or zinc, nickel dithiolene complexes, quinone analogues, diimonium compounds and azo derivatives.

NIR absorptive inorganic materials are often based on Tungsten based oxides (WxOy, MWO3) that can be employed in different stoichiometric form, while less studied are Nickel and Iridium based oxides (NiOx and IrOx). In particular. (Tungsten based oxide)-materials showed a remarkable near-infrared (NIR) shielding while retaining a high transmittance of visible light and for this reason they have potential applications in the field of architectural (smart windows) and automotive window glass.

Commercial example of inorganic Tungsten based oxide—NIR absorber were developed by Fuji PIGMENT Co. Ltd. In particular, the series FUJI EL MWO3 is a class of materials able to absorb and shield NIR radiation maintaining high transparency in the visible spectral range. In addition, because of their inorganic nature they are very robust and have high resistance against light and surrounding environment. The FUJI EL MWO3 series can be applied to different base materials by coating or mixing.

In general, the absorption depends on the concentration of absorbing medium provided per area passed through be the incident light. One can consider different parameters to evaluate the respective concentration of e.g. absorbing dyes that is to be added to a paint or to a polymeric matrix to achieve the desired absorption efficiency. The parameters include, for example, the absorptivity value that represents the efficiency of the NIR dye to absorb radiation, and the final thickness of the coating, film, or other type of matrix that is acceptable. In addition, other practical aspects such as a limited solubility or degradation of the absorbing medium. e.g. the NIR dye, in the chosen carrier/matrix or during thermal process should be considered.

For example by adding 0.005% wt of Lumogen IR 765 in transparent acrylic panel having a thickness of 3 mm, the amount of IR radiation that can be captured can be estimated to be around 15% with respect to the total IR radiation coming from the sun. This amount can be further increased by adding higher concentration of Lumogen IR 765 and/or by using a combination of IR absorbers able to absorb a larger portion of the NIR radiation. For example, absorption efficiency can reach values greater than 70%, preferably greater than 80%, or more preferably greater than 90% with respect to the incident NIR radiation.

Herein, absorption refers to those physical and/or chemical processes where electromagnetic energy imping on an absorbing material is converted (e.g. transformed) into internal energy of that material. The degree of absorption represents the fraction of electromagnetic energy removed from the electromagnetic field by the absorbing material over the total electromagnetic energy impinging on such material. The absorption spectrum of IR absorbers can show an absorbing tail in the visible range (e.g. in the range from 700 nm to 400 nm). The integral of the absorption profile as a wavelength function, of the IR absorber, evaluated in the visible range, can be lower than 30%, preferably lower than 20%, and more preferably lower than 10% of the total integral of the same absorption profile in the wavelength interval of interest for this application (e.g. 400 nm to 2500 nm). Accordingly, the electromagnetic energy absorbed by the tail of the absorbing spectrum of the IR absorber in the visible range (e.g. 400 nm to 700 nm) can be lower than 20%, preferably lower than 10%, or more preferably lower than 5% of the total electromagnetic energy in that visible range that is impinging on the absorber.

Moreover, the maximal luminance achievable by the system can be tuned by providing additional absorption in the visible spectrum, e.g. by adding a visible absorbing material (VIS absorber). The added visible absorption can show an absorption spectrum that is substantially flat in the visible range to not affect the chromatic aspects discussed herein. In this context, substantially flat means that the absorbing profile of the VIS absorber assumes values in the visible range (e.g. 400 nm to 700 nm) with standard deviation over mean smaller than 100%, preferably smaller than 50%, and more preferably smaller than 30%, when the profile is sampled with wavelengths that are spaced with wavelength differences in the range from, for example, 10 nm to 20 nm.

In some embodiments, the VIS absorber is selected to affect the chromatic aspects discussed herein in a desired or acceptable range, e.g. by providing an over all color change in the appearance of the facade.

With respect to the chromatic diffusing layer of the chromatic facade unit, the present disclosure relates to an optical diffuser as disclosed in WO 2009/156348 A1, filed by the same applicants, as a sky-sun nanodiffuser in the noon configuration. Therein the term "sky-sun nanodiffuser" designates an optical diffuser that simulates the diffusion of the sunlight by the sky in nature. Accordingly, the herein disclosed chromatic facade unit may relate in some embodiments to an optical nanodiffuser of that type disclosed in WO 2009/156348 A1 that comprises an essentially transparent solid matrix in which a plurality of solid transparent nanoparticles are dispersed, e.g. in a thin film, coating, or bulk material such as sandwich embodiments. In the present description the terms "diffusing layer", "nanodiffuser", and "chromatic diffusing layer" designate in general an optical element, which comprises a matrix embedding those (essentially transparent) nanoparticles. The chromatic facade unit as disclosed herein has the additional feature of NIR absorption.

Within the visible spectrum, the chromatic diffusing layer is in principle capable of (chromatically) separating different chromatic components of incident light having a broad spectral bandwidth in the visible range (such as in general white light) according to the same mechanism that gives rise to chromatic separation in nature. Rayleigh scattering is creating, for example, the spectral distribution characteristic of skylight and sunlight. More particularly, the chromatic diffusing layer is capable of reproducing—when subject to visible white light—the simultaneous presence of two different chromatic components: a diffused sky-like light, in which blue—in other words the blue or "cold" spectral portion—is dominant, and a transmitted and by the reflective surface reflected light, with a reduced blue component—in other words the yellow or "warm" spectral portion.

In some embodiments, a reflective structural unit may be based on a mirror structure as disclosed in WO 2015/172821 A1, which is incorporated herein by reference. In particular, WO 2015/172821 A1 discloses a mirror with a mirroring surface and a diffusing layer in front of the mirroring surface. The diffusing layer preferentially scatters short-wavelength components of impinging light with respect to long-wavelength components of the impinging light. For example, the scattering occurs in the Rayleigh or extended Rayleigh-like regime.

Referring to those specific reflecting properties of a chromatic facade unit, its structure is such that it achieves—based on the nanoparticles—a specific optical property that comprises a specular reflectance in particular in the visible wavelength range that is larger in the red than in the blue, and a diffuse reflectance that is larger in the blue than in the red. The optical property can be fulfilled, for example, over at least 50% of the reflective surface, preferably over at least 70%, or even over at least 90%.

Herein, as defined in the Standard Terminology of Appearance, ASTM international, E 284-09a, the reflectance is in general the ratio of the incident flux to the incident flux in the given conditions. For example, the diffuse reflectance is a property of the respective specimen that is given by the ratio of the reflected flux to the incident flux, where the reflection is at all angles within the hemisphere bounded by the plane of measurement except in the direction of the specular reflection angle. Similarly, the specular reflectance is the reflectance under the specular angle, i.e. the angle of reflection equal and opposite to the angle of incidence. In the context of the present disclosure, for a given wavelength and a given position on the reflective surface section, the diffuse reflectance and the specular reflectance are intended for non-polarized incident light with an incident angle of 45° with respect to the normal to the reflective surface (section) at the given position. For measurements, the angular size of the detector for the measurement of specular reflection and the angular aperture of the incident beam is selectable in a range as it will be apparent to the skilled person. In particular when considering (white light) low angle diffusers, for example, the angular size of the detector for the measurement of specular reflection and the angular aperture of the incident beam should be configured so that the sensor accepts rays with a reflection within a cone around the reflection axis. In some embodiments, an angular aperture of 2 times 0.9° may be used as disclosed, for example, in BYK-Gartner "Perception and Objective Measurement of Reflection Haze" for hazemeters and glossmeters introduction, Friedhelm Fensterseifer, BYK-Gardner. BYK-Gardner Catalog 2010/2011).

Moreover, the reflected flux is averaged over all possible incidence azimuthal angles. In case the measurement of the diffused reflectance and/or the specular reflectance is hindered by geometrical or other physical constraints related to the configuration of the chromatic facade unit, the skilled person may have access to the above mentioned quantities by forming at least one separate chromatic reflective section from the chromatic facade unit and measuring the reflectance directly onto that section. For details of microscopic structural properties, it is referred to, for example, the above mentioned publication WO 2009/156348 A1. However, different values of microscopic parameters may be applicable. For example, one may apply parameters that lead to a larger amount of scattered light with respect to non-scattered light. Similarly, in the aim of minimizing or at least reducing the visibility of the specular reflected scene, one may prefer increasing the contribution to the luminance of the chromatic facade unit due to diffused light in spite of the fact that the resulting perceived color may depart from the color of a perfect clear sky. The latter may be caused by reducing the level of color saturation as a consequence of the multiple scattering arising therein and may be even caused at concentrations below the concentration giving rise to multiple scattering. e In the following, some microscopic features are summarized exemplarily that relate to the features of a chromatic reflective layer in the visible spectrum, e.g. in the wavelength range from about 400 nm to about 700 nm.

The chromatic effect is based on nanoparticles having a size in the range from, for example, 10 nm to 240 nm. For example, an average size may be in that range.

It is well known from fundamentals of light-scattering that a transparent optical element comprising transparent matrix and transparent nanoparticles having different refraction index with respect to the matrix, and having sizes (significantly) smaller than visible wavelength, will preferentially scatter the blue part (the blue) of the spectrum, and transmit the red part (the red). While the wavelength-dependence of the scattering efficiency per single particle approaches the $\lambda^{-4}$ Rayleigh-limit law for particle sizes smaller or about equal to $\frac{1}{10}$ of the wavelength $\lambda$, a respective acceptable optical effect may be reached already in the above range for the size of the nanoparticles. In general, resonances and diffraction effects may start to occur at sizes larger, for example, half the wavelength.

On the other side, the scattering efficiency per single particle decreases with decreasing particle size d, proportional to $d^{-6}$, making the usage of too small particles inconvenient and requiring a high number of particles in the propagation direction, which in turn may be limited by the allowed filling-fraction. For example, for thick scattering layers, the size of the nanoparticles embedded in the matrix (and in particular their average size) may be in the range from 10 nm to 240 nm, such as 20 nm to 100 nm, e.g. 20 nm to 50 nm, and, for compact devices, e.g. using thin layers such as coatings and paints, the size may be in the range from 10 nm to 240 nm, such as 50 nm to 180 nm, e.g. 70 nm to 120 nm.

In some embodiments, larger particles may be provided within the matrix with dimensions outside that range but those particles may not affect the Rayleigh-like feature and, for example, only contribute to forming a low-angle scattering cone around the specular reflection.

The chromatic effect is further based on nanoparticles having a refractive index that is different from the refractive index of the embedding matrix. To scatter, the nanoparticles have a real refractive index $n_p$ sufficiently different from that of the matrix $n_h$, (also referred to as host material) in order to allow light scattering to take place. For example, the ratio m between the particle and host medium refractive indexes (with $$m \equiv \frac{n_p}{n_h})$$

may be in the range $0.5 \leq m \leq 2.5$ such as in the range $0.7 \leq m \leq 2.1$ or $0.7 \leq m \leq 1.9$.

The chromatic effect is further based on the number of nanoparticles per unit area seen by the impinging light propagating in the given direction as well as the volume-filling-fraction f. The volume filling fraction f is given by $$f = \frac{4}{3}\pi \left(\frac{d}{2}\right)^3 \rho$$

with $\rho$ [meter$^3$] being the number of particles per unit volume. By increasing f, the distribution of nanoparticles in the diffusing layer may lose its randomness, and the particle positions may become correlated. As a consequence, the light scattered by the particle distribution experiences a modulation which depends not only on the single-particle characteristics but also on the so called structure factor. In general, the effect of high filling fractions is that of severely depleting the scattering efficiency. Moreover, especially for smaller particle sizes, high filling fractions also impact the dependence of scattering efficiency on wavelength, and on angle as well. One may avoid those "close packing" effects, by working with filling fractions $f \leq 0.4$, such as $j \leq 0.1$, or even $f \leq 0.01$ such as $f = 0.001$.

The chromatic effect is further based on a number N of nanoparticles per unit area of the chromatic diffusive layer in dependence of an effective particle diameter $D = d\, n_h$. Thereby, d [meter] is the average particle size defined as the average particle diameter in the case of spherical particles, and as the average diameter of volume-to-area equivalent spherical particles in the case of non-spherical particles, as defined in [T. C. GRENFELL, AND S. G. WARREN, "Representation of a non-spherical ice particle by a collection of independent spheres for scattering and absorption of radiation". Journal of Geophysical Research 104, D24, 31,697-31,709. (1999)]. The effective particle diameter is given in meters or, where specified, in nm.

In some embodiments:

$$N \geq N_{min} = \frac{2.07 \times 10^{-29}}{D^6} \left|\frac{m^2+2}{m^2-1}\right|^2 \; [\text{meters}^{-2}],$$

(D given in [meters]) and $$N \leq N_{max} = \frac{1.21 \times 10^{-27}}{D^6} \left|\frac{m^2+2}{m^2-1}\right|^2 \; [\text{meters}^{-2}];$$

for example.

$$N \geq N_{min} = \frac{4.24 \times 10^{-29}}{D^6} \left|\frac{m^2+2}{m^2-1}\right|^2 \; [\text{meters}^{-2}] \text{ and}$$

$$N \leq N_{max} = \frac{9.27 \times 10^{-28}}{D^6} \left|\frac{m^2+2}{m^2-1}\right|^2 \; [\text{meters}^{-2}],$$

more specifically $$N \geq N_{min} = \frac{8.99 \times 10^{-29}}{D^6} \left|\frac{m^2+2}{m^2-1}\right|^2 \; [\text{meters}^{-2}] \text{ and}$$

$$N \leq N_{max} = \frac{6.48 \times 10^{-28}}{D^6} \left|\frac{m^2+2}{m^2-1}\right|^2 \; [\text{meters}^{-2}].$$

For example, for embodiments aiming at simulating the presence of a pure, clear sky, $$N \geq N_{min} = \frac{2.07 \times 10^{-29}}{D^6} \left|\frac{m^2+2}{m^2-1}\right|^2 \; [\text{meters}^{-2}],$$

(D given in [meters]) and $$N \leq N_{max} = \frac{3.69 \times 10^{-28}}{D^6} \left|\frac{m^2+2}{m^2-1}\right|^2 \; [\text{meters}^{-2}]$$

such as $$N \geq N_{min} = \frac{4.24 \times 10^{-29}}{D^6} \left|\frac{m^2+2}{m^2-1}\right|^2 \; [\text{meters}^{-2}] \text{ and } N \leq N_{max} = \frac{2.79 \times 10^{-28}}{D^6} \left|\frac{m^2+2}{m^2-1}\right|^2 \; [\text{meters}^{-2}],$$

more specifically $$N \geq N_{min} = \frac{8.99 \times 10^{-29}}{D^6} \left|\frac{m^2+2}{m^2-1}\right|^2 \; [\text{meters}^{-2}] \text{ and } N \leq N_{max} =$$

-continued
$$\frac{2.06 \times 10^{-28}}{D^6} \left| \frac{m^2+2}{m^2-1} \right|^2 \, [\text{meters}^{-2}].$$

In other embodiments aiming at minimizing the contribution of a specular reflected scene, $$N \geq N_{min} = \frac{2.79 \times 10^{-28}}{D^6} \left| \frac{m^2+2}{m^2-1} \right|^2 \, [\text{meters}^{-2}],$$

(D given in [meters]) and $$N \leq N_{max} = \frac{1.21 \times 10^{-27}}{D^6} \left| \frac{m^2+2}{m^2-1} \right|^2 \, [\text{meters}^{-2}]$$

such as $$N \geq N_{min} = \frac{3.69 \times 10^{-28}}{D^6} \left| \frac{m^2+2}{m^2-1} \right|^2 \, [\text{meters}^{-2}] \text{ and } N \leq N_{max} =$$

$$\frac{9.27 \times 10^{-28}}{D^6} \left| \frac{m^2+2}{m^2-1} \right|^2 \, [\text{meters}^{-2}],$$

more specifically $$N \geq N_{min} = \frac{4.85 \times 10^{-28}}{D^6} \left| \frac{m^2+2}{m^2-1} \right|^2 \, [\text{meters}^{-2}] \text{ and } N \leq N_{max} =$$

$$\frac{6.48 \times 10^{-28}}{D^6} \left| \frac{m^2+2}{m^2-1} \right|^2 \, [\text{meters}^{-2}].$$

In general, any of the following factors may be applied as upper or lower limit, including that value or excluding that value respectively in the term $$\frac{\text{factor}}{D^6} \left| \frac{m^2+2}{m^2-1} \right|^2;$$

| factor (e.g. for Nmin) | factor (e.g. for Nmax) |
| --- | --- |
| 4.24e−29 | 9.27e−28 (1.04e−27) |
| 8.99e−29 | 6.48e−28 (7.27e−28) |
| 2.79e−28 | 3.69e−28 |
| 3.69e−28 (4.14e−28) | 2.79e−28 |
| 4.85e−28 (5.44e−28) | 2.06e−28 |
| 9.27e−28 (1.04e−27) | 1.21e−27 |
| 9.48e−28 (1.06e−27) | 1.17e−27 (1.31e−27) |
| 9.72e−28 (1.09e−27) | 1.07e−27 (1.20e−27) |

With respect to those physical parameters and their general interplay, it is again referred to WO 2009/156348 A1.

The macroscopic optical properties of the chromatic facade unit disclosed herein can be described in terms of the two following quantities:

(i) The monochromatic normalized specular reflectance $R(\lambda)$, defined as the ratio between the specular reflectance of the chromatic facade unit and the specular reflectance of a reference sample identical to the chromatic facade unit except for the fact that the diffusing layer, does not contain the nanoparticles which are responsible of preferentially diffusing the short wavelengths of the impinging radiation, e.g. having a size in the range from 10 nm to 240 nm.

(ii) The ratio $\gamma$ between the blue and the red optical densities defined as: $\gamma = \text{Log}[R(450 \text{ nm})]/\text{Log}[R(630 \text{ nm})]$ that measures the capacity of the chromatic reflective device to provide chromatic separation between long and short wavelength components of the impinging radiation.

In some embodiments, the chromatic facade unit, and in particular a chromatic reflective section, may have:

$R(450 \text{ nm})$ in the range from 0.05 to 0.95, for example from 0.1 to 0.9 such as from 0.2 to 0.8. For example for embodiments aiming at simulating the presence of a pure clear sky, $R(450 \text{ nm})$ may be in the range from 0.4 to 0.95, for example from 0.5 to 0.9 such as from 0.6 to 0.8.

In embodiments aiming at reducing (e.g. minimizing) the contribution of a specular reflected scene, $R(450 \text{ nm})$ may be in the range from 0.05 to 0.5, for example from 0.1 to 0.4 such as 0.2 up to 0.3.

With respect to the ratio $\gamma$ between the blue and the red optical densities in some embodiments, $\gamma$ may be in the range $5 \geq \gamma \geq 1.5$, or even $5 \geq \gamma \geq 2$ or even $5 \geq \gamma \geq 2.5$ such as $5 \geq \gamma \geq 3.5$.

For completeness, regarding the use in an outside environment, inorganic particles suited for this type of a Rayleigh-like scattering application may be those that include but are not limited to $ZnO$, $TiO_2$, $ZrO_2$, $SiO_2$, and $Al_2O_3$ which have, for example, an index of refraction $n_p=2.0$, 2.6, 2.1, 1.5, and 1.7, respectively, and any other oxides which are essentially transparent in the visible region. In the case of inorganic particles, an organic matrix or an inorganic matrix may be used to embed the particles such as soda-lime-silica glass, borosilicate glass, fused silica, polymethylmethacrylate (PMMA), and polycarbonate (PC). In general, organic particles may also be used, in particular for illuminated configurations having, for example, a reduced or no UV portion.

The shape of the nanoparticle can essentially be any, while spherical particles are most common.

As mentioned above, the nanoparticles and/or the matrix and/or further embedded particles may not—or may only to some limited extent—absorb visible light. Thereby, the luminance and/or the visible spectrum (i.e. the color) of the light exiting the chromatic facade unit may only be very little or not at all affected by absorption. An essentially wavelength-independent absorption in the visible spectrum may be acceptable. Accordingly, the NIR absorbing material will have features that essentially do not affect the visible spectrum.

Combining the above features of the chromatic diffusing layer with the absorbing features disclosed herein may allow addressing one or more aspects of the prior art as will be exemplarily described below for various exemplary embodiments.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
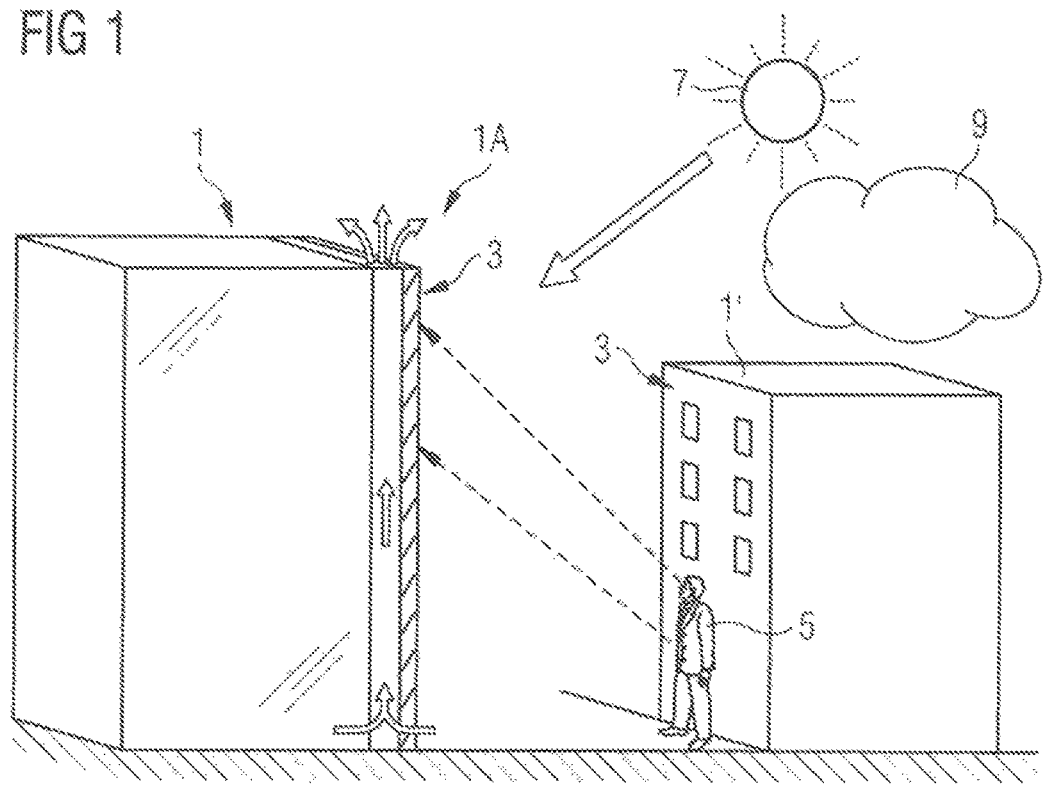
FIG. 1 is a schematic perspective view of a street of buildings for illustrating the use of an exemplary chromatic facade unit facilitating specific reflection properties as well as NIR absorption.
Figure 2:
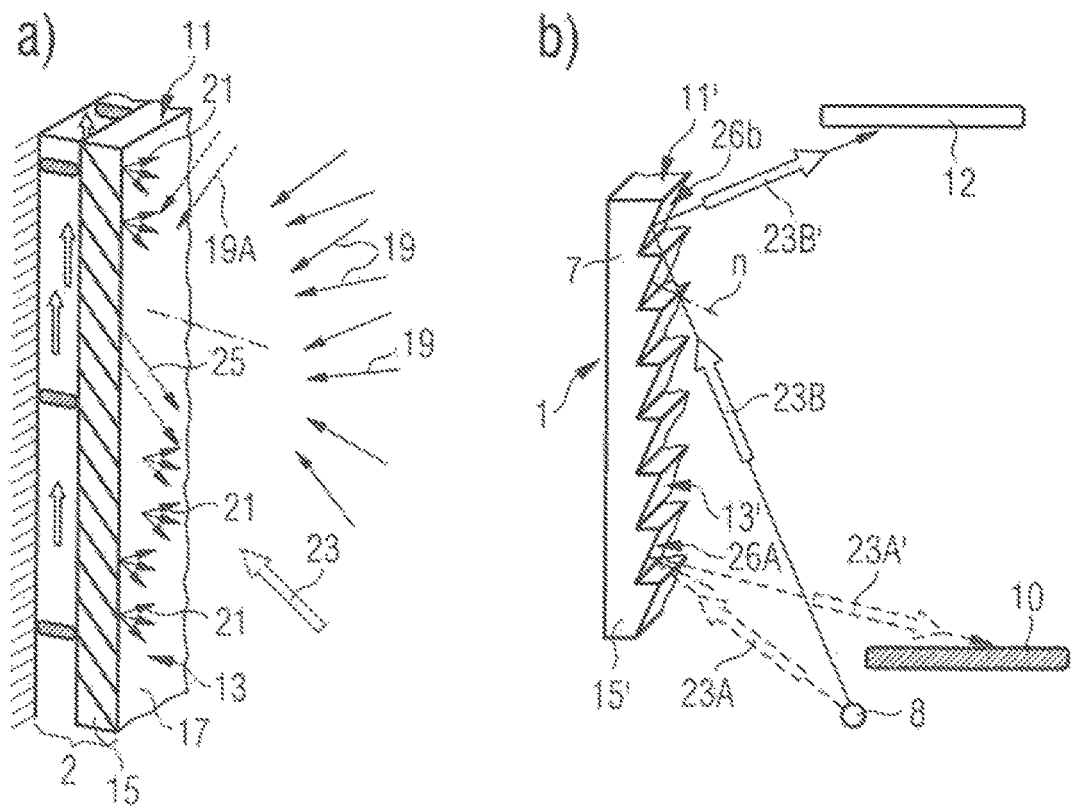
FIG. 2(a) and FIG. 2(b) are schematic views of exemplary chromatic facade units illustrating generally the contributions of diffused light and specular reflected light for the appearance and the IR absorption for thermal convection.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that in facade configurations like those described in the international patent application PCT/EP2015/001454 mentioned above, the specular reflection of the sun light will guide radiation not only in the visible spectrum but also in the NIR and IR spectrum towards the ground. The inventors realized that separating the optical characteristic of a facade unit for the visible and the NIR wavelength ranges may allow providing the desired optical effect in the appearance of a building being equipped with respective facade units while removing heat energy (NIR radiation contribution) from the redirected sun light. This may result in a reduction of heat at the bottom of the building. In other words, the light entering the space between the buildings creates less warming of the area at the bottom of the building and a cooled environment may be achieved. This may, in particular, be of interest in streets of buildings (e.g. downtown areas) in particular in respective warm climate zones.

Figure 7:
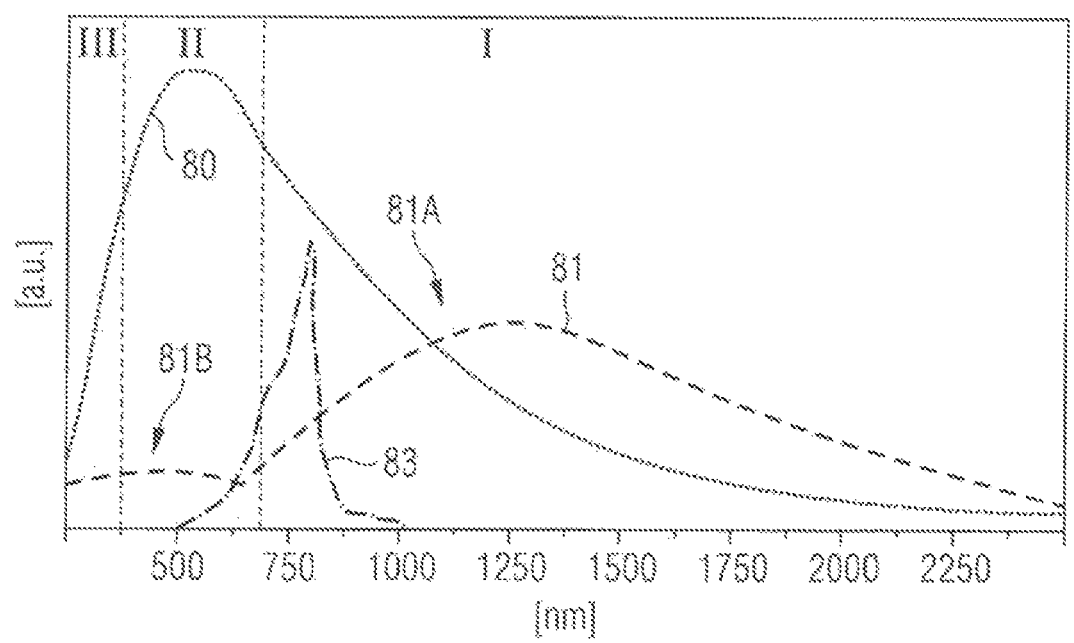
FIG. 7 is an illustration of absorption characteristics of NIR absorbers.

With reference to FIG. 7 showing schematically the spectral emission of the sun (without atmospheric absorption). Specifically, a curve 80 illustrates schematically, for example, the radiant energy per unit area or similarly the irradiance over the emitted wavelength, it is noted that, while the visible spectral portion II contains more than 40% of the total radiant energy emitted from the sun, an even larger part is contained in the NIR spectral portion I (almost 50%). In the UV spectral portion III, less than 10% of the total radiant energy is included. Accordingly, removing the NIR spectral portion I at least partly from the incident sun light may result in a significant reduction of energy guided to the bottom of the buildings within a street of buildings.

In addition, the absorption of the NIR radiation may be used for the cooling or warming of buildings. Absorbing the NIR radiation with the facade units and providing an opened air circulating system along the facade units may allow the formation of a chimney effect in which the absorbed radiation is transferred as heat to the upward circulating air and released, e.g. at the top of the building. Alternatively, a closed air system may receive the absorbed heat and allow distributing that absorbed heat where needed, e.g. for heating purposes during transition and winter times.

Furthermore, the above heat aspects may be realized together with the chromatic effect in the perception of the building. It is noted that a visual appearance of a chromatic facade unit may be provided even in absence of directional illumination (such as in absence of direct sun illumination or collimated projected light) and may still produce a realistic and vivid sky and sun appearance, together with a natural depth perception associated to those. For example, the chromatic output was realized to convert the gray shades of an overcast sky into a wide distribution of colors that are typical for the sky of a clear or partly clear day, including the warm blue hues of a perfectly clear bright sky and the warmer yellow and red tinges produced by sunlight propagating through a long path in the atmosphere and illuminating e.g. a group of clouds. The chromatic output was further realized to resemble even under essentially overcast weather conditions—as an example of light conditions without a contribution of directional light as associated to sun rays or an illumination by a projector (i.e. as in illuminated configurations) to the illumination of the chromatic facade unit—the visual appearance of the sky.

The disclosure is further based in part on the realization that downward guiding of light into canyon-like streets delimited by skyscrapers may be increased by increasing the angle between the normal to reflective surface sections and the normal of the wall (central plane), this providing an increase in the amount of natural illumination at the ground level. Due to the absorbing of NIR radiation with the chromatic facade units, despite increased illumination the heat radiation can be reduced.

In the following, various embodiments of a chromatic facade unit are disclosed in connection with FIGS. 1 to 6.

Specifically, the function of a facade based on the herein disclosed concepts of chromatic facade units is explained in connection with FIGS. 1, 2(a), and 2(b) for a street of buildings 1, 1' representing exemplarily a downtown situation. As shown in the schematic perspective view of FIG. 1, a front wall 1A of building 1 is covered by a facade 3 made of a plurality of chromatic facade units that are attached to front wall 1A via a mounting system. The mounting system may be configured to mount one or more chromatic facade units. A chromatic facade structural unit 2 may thus comprise one or more a chromatic facade units and an associated mounting system. While in FIG. 1, the complete front wall 1A is covered, the facade may alternatively be limited to some portion of front wall 1A such as a top section of building 1.

An observer 5 may walk along a street that runs along the bottom of buildings 1, 1' and may look at facade 3. Facade 3 is configured to provide a chromatic effect to achieve, for example, a sky-like bluish visual appearance of building 1 by using the chromatic feature under natural illumination. The natural illumination may include cloudy weather conditions as well as partly sunny conditions as schematically indicated in FIG. 1 with a sun 7 and a cloud 9.

With respect to the chromatic effect, it is referred to the international patent application PCT/EP2015/001454 mentioned above. For example, the various chromatic facade units will be perceived as having a bluish color with varying blue tones and purity levels, e.g. in case of a cloudy day as will be explained in connection with FIG. 2(b). Generally, observer 5 may perceive diffuse light generated by a chromatic diffusing layer as well as specular reflected light. The specular reflected light originates from an area in the sky defined by the viewing angle on a respective reflective surface section as explained in connection with FIG. 2(a). The sum of both light components, the blue diffuse light and the yellow reflected light, defines the color perceived for the respective reflective surface section of facade 3.

To create the chromatic effect, the chromatic facade unit of facade 3 has reflective surface sections that are covered by a chromatic diffusing layer. The reflective surface sections may be planar in shape or may extend in 3D as a 3D-type surface such as a curved or partially curved surface. For example, the reflective surface sections may be formed by applying a reflective layer on a plurality of non-coplanar surface sections of a support structure.

The chromatic diffusing layer may comprise a plurality of nanoparticles embedded in a transparent matrix. The nanoparticles and the transparent matrix have a difference in the refractive index. As described above, that difference in the refractive index, the size distribution of the nanoparticles embedded in the matrix, and the number of nanoparticles per unit surface area are selected such that a specular reflectance is provided that is larger in the red (in the meaning of longer wavelengths of an incident broad spectrum) than in the blue (in the meaning of shorter wavelengths of an incident broad spectrum), and that a diffuse reflectance is provided that is larger in the blue than in the red.

With reference to FIGS. 2(a) and 2(b), the optical features and the optical appearance as affected by a specular reflected image of the sky will be explained. FIG. 2(a) shows a schematic perspective view of a panel-shaped chromatic facade unit 11 with an essentially planar reflective surface 13, while FIG. 2(b) illustrates a chromatic facade unit 11' with reflective surface sections 13' in a saw-like shape arrangement. Chromatic facade units 11, 11' could be used to build facade 3 shown in FIG. 1.

Referring to FIG. 2(a), chromatic facade unit 11 comprises—in a compact configuration—a substrate 15 providing the panel shape and a chromatic reflective layer 17 provided on the surface of substrate 15 forming planar reflective surface 13. Substrate 15 may be a casted polymeric layer such as foam having a back layer such as metals (e.g. aluminum or steel) and in some cases, a layer of PVC may also be added.

Chromatic reflective layer 17 comprises a reflective layer and a chromatic diffusing layer. In the embodiment shown in FIG. 2(a), the layers may be applied, for example, as a continuous layer onto substrate 15.

In the embodiment of FIG. 2(b), due to a in cross-section saw tooth-like shaped substrate 15', reflective surface sections 13' form in height direction a sequence of surface sections that are regularly displaced with respect to each other and that are inclined in the mounted state with respect to the vertical direction. Accordingly, reflective surface sections 13' indicated in FIG. 2(b) are non-coplanar with respect to each other as they do not lie in a common plane. It is noted that neighboring reflective surface sections may in principle be coplanar, or a subgroup of the same, may be coplanar. In addition, the reflective surface sections may have a planar shape or a curved shape. As reflective surface 13, reflective surface sections 13' are formed by a chromatic reflective layer 17 comprising a reflective layer and a chromatic diffusing layer.

Referring to FIG. 2(a), chromatic facade unit 11 reflects visible incident light 19 (for simplicity herein also referred to plainly as incident light) at the reflective layer of reflective surface 13 after the light having passed the chromatic diffusing layer once such that specular reflected visible light has passed the chromatic diffusing layer twice. As illustrated in FIG. 2(a), visible incident light 19 may be directed sun light or not-directed light that falls onto chromatic facade unit 11 from the right side in FIG. 2(a).

As discussed above, the chromatic diffusing layer is constructed such that it preferentially scatters short-wavelength components of visible incident light 19 with respect to long-wavelength components of visible incident light 19. The scattered light is referred herein as visible diffuse light 21 (for simplicity herein also referred to plainly as diffuse light) as schematically indicated at selected positions of reflective surface 13. Diffuse light 21 is associated with a blue (short-wavelength) color assuming a given selection of the scattering conditions of the nanoparticles.

In FIG. 2(a), an exemplary viewing direction 23 of an observer is indicated. In viewing direction 23, the observer will see the portion of diffuse light 21 that is emitted in his direction because diffuse light 21 is essentially homogenously emitted in all directions from the chromatic diffusing layer. Clearly, those portions being emitted towards the reflective layer are reflected and may also be seen when looking at chromatic facade unit 11. In addition, the observer sees specular reflected light 25 (being "yellow" as discussed above due to the scattering of the blue components). The seen specular reflected light 25 is based on that portion 19A of incident light 19 that is redirected by chromatic facade unit 11 to face viewing direction 23 of the observer. The redirection may include pure specular reflection as well as some forward scattering as also discussed in the international patent application PCT/EP2015/001454 mentioned above.

As a consequence of the embedded nanoparticles, that portion of incident light 19, which is regularly reflected at the reflective layer without being deviated by scattering interaction with the chromatic diffusing layer, has a visible spectrum that differs from the spectrum of incident light 19 in an associated center of mass-wavelength because the spectrum is shifted towards longer wavelengths (i.e. to the red giving a yellow tone). The portion of incident light 19, which is subject to the essentially Rayleigh-like scattering by the nanoparticles, is emitted in a diffuse manner, thereby leading to substantially homogeneous luminance in all the directions pointing away from reflective surface 13. It is noted that the diffuse light is based on the complete luminance (all incident light 19) to which chromatic facade unit 11 is subjected from any direction. In other words, all light incident on chromatic facade unit 11 contributes to the diffuse light, irrespective of the direction under which the light is incident.

As a consequence, the light seen when looking at chromatic facade unit 11 under a certain direction (such as viewing direction 23 in FIG. 2(a)) comprises a superposition of light being specular reflected and diffuse light generated by the scattering and being scattered towards the respective direction. As will be apparent, an observer looking onto chromatic facade unit 11 from some viewing angle may have a perception as if the observer looks into the blue sky, in the case that the chromatic separation provided by chromatic facade unit 11 includes a "dominant" diffuse light component. In contrast, he may have a perception as if he looks into the sun or into an object illuminated by the sun, e.g. bright clouds, in the case that the chromatic separation provided by the chromatic facade unit includes a dominant specular reflected component. Accordingly, the luminance of perceived reflected portion of incident light 19 is relevant for the respective color impression perceived by the observer. This is explained in the following in connection with FIG. 2(b) for an exemplary embodiment of tilted reflective surface sections 13'.

Assuming the case of a facade of a building being formed by a chromatic facade unit as disclosed herein, a vertical orientation of the chromatic facade unit is shown in FIG. 2(b). Chromatic reflective facade sections 26A, 26B may be associated with a common direction of a normal n. As shown in FIG. 2(b), normal n is oriented towards the ground.

As will be explained below, an observer standing on the ground, i.e. below chromatic facade unit 11', preferentially sees the lower part of the facade (chromatic reflective facade sections 26A) as being blueish, while the top part of the facade (chromatic reflective sections 26B)—its position and orientation causing the observer to see the specular reflection of the high bright sky—is seen as being yellowish. It is noted that the ratio between the bluish and the yellowish contributions as seen by the observer may be varied by changing the inclination of the reflective surface sections 13'. The ratio may increase (i.e. more bluish perception) with the increase of the angle between the normal n of the respective reflective surface section 13' and the normal to the wall of the building.

Specifically, an observer (illustrated by a dot 8 in FIG. 2(b)) looking in the direction 23A at chromatic reflective section 26A of chromatic facade unit 11', sees a dark object 10, e.g. sees the ground, due to its viewing direction being reflected along a direction 23A'. Consequently, chromatic reflective section 26A appears blue to the observer. In fact, the luminance of chromatic reflective section 26A, as seen by the observer along direction 23A, has a low contribution due to the specular reflection, i.e. a low yellow (long-wavelength) component. For that reason, the main contribution to the luminance of chromatic reflective section 26A along direction 23A is the contribution of the Rayleigh-like scattered light, i.e. the contribution of the light impinging from any direction onto chromatic reflective section 26A, which is eventually scattered against direction 23A, along which the observer is looking.

In contrast, the observer, when looking in a direction 23B at chromatic reflective section 26B of chromatic facade unit 11', sees—reflected along the direction 23B' of specular reflection—a bright object 12, e.g. a luminous over-casted, white sky. Consequently, the luminance of chromatic reflective section 26B against direction 23B has a strong contribution due to the specular reflection, i.e. a strong yellow (long-wavelength) component. For that reason, the main contribution to the luminance of chromatic reflective section 26B as seen by the observer is the contribution of the reflected light. Consequently, chromatic reflective section 26B appears yellow to the observer.

In summary, a chromatic facade unit may be sufficiently large or comprise a plurality of abutted chromatic reflective sections so that the following conditions are met:

1. The characteristic of the luminance distribution of the light, which illuminate the chromatic reflective surface or the plurality of chromatic reflective surface sections may change, e.g. in angle and/or intensity over the facade. For example, the lower portion of a chromatic facade unit may be less illuminated than the upper.

2. An observer looking at the chromatic reflective surface or the plurality of chromatic reflective surface sections sees different portions under significantly different viewing angles.

The first and/or the second condition may cause different portions of a chromatic reflective surface or different chromatic reflective surface sections to be seen by the observer in different colors as described above.

Figure 3:
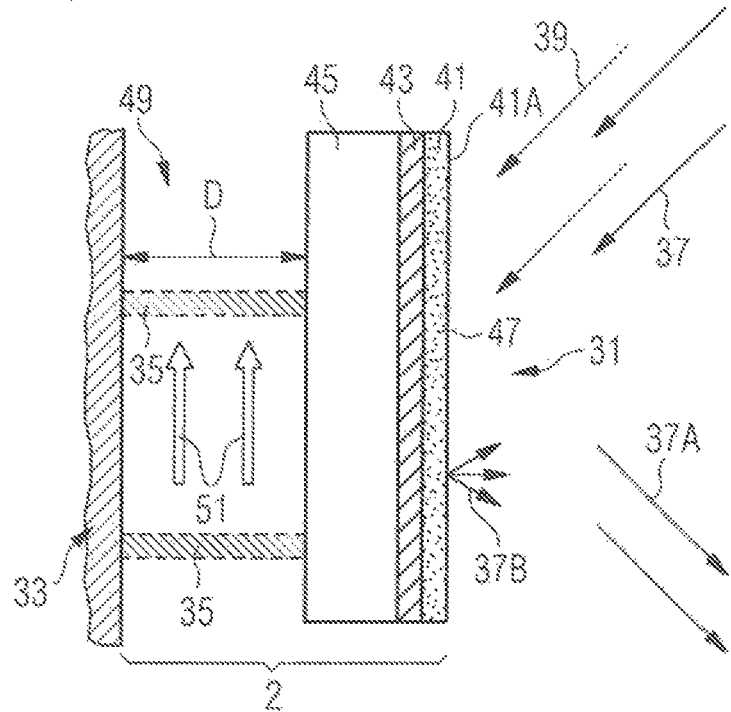
FIG. 3 is a schematic cross-section of an exemplary chromatic facade unit illustrating the aspect of providing IR absorbing material.

FIG. 3 is an illustration for explaining the consequence when distinguishing in the optical features of a chromatic facade unit with respect to visible and NIR wavelength of incident light 19.

Specifically, FIG. 3 illustrates an exemplary cross-section of a chromatic facade unit 31 that is configured in a sandwich-type configuration and attached at some distance D at a wall 33 of a building via mounts 35. The mounts may be configured as local pins provided in a grid-structure, or a line/grid of mounting bars. Mounts 35 may be attached in a known manner to the building such as by screwing, welding etc.

Chromatic facade unit 31 comprises—as part of the chromatic reflective layer—a chromatic diffusing layer 41 with a front side 41A being subject to illumination by the sun, in the visible spectral range (rays 37) and in the infrared spectral range (rays 39). Chromatic diffusing layer 41 is applied onto a reflective layer 43 that is stabilized by a support structure 45. In addition, an absorbing material is provided in chromatic diffusing layer 41 and/or reflective layer 43. As an example for an absorbing material, absorbing particles 47 are indicated by dots exemplarily in chromatic diffusing layer 41.

From the sun radiation, primarily only light in the visible spectral range is reflected (rays 37A) or diffused (rays 37B). The radiation in the infrared spectral range is absorbed by the absorbing material (absorbing particles 47) such that the complete chromatic facade unit 31 is heated by absorption. The heated chromatic facade unit 31 will in particular transfer energy to any air within a chimney system 49 formed between wall 33 and chromatic facade unit 31, specifically support structure 45. The warm air raises up within chimney system 49 (a flow direction 51 is indicated by arrows) and can be released, for example, at outlets on top of building 1 (see FIG. 1). The air flow allows cooling the heated chromatic facade unit 31 as well as the building itself. Moreover, air from a suction area at the bottom or a lower part of the facade will be sucked into chimney system 49, introducing some large scale ventilation e.g. at the front of the building, while on the other side the facade provides the above discussed optical effects.

In contrast to FIG. 3, the embodiment of a chromatic facade unit 31' comprises a chromatic diffusing layer 41' being, for example, configured as a self-supporting panel that is attached at a distance D' via mounts 52 to a support structure 45' having, for example, a modulated surface with a reflective layer 43' applied thereon.

In general and depending on the type of embodiment, the distances D, D' may be in the range from about 1 cm to about 20 cm such as in the range from about 3 cm to about 15 cm or even as in the range from about 5 cm to 10 cm. In some embodiments such as in the one shown in FIG. 4, the distances D, D' may also be smaller than 1 cm such as in the range from 0.3 mm to about 5 cm.

In this case a chimney system 49' is created in the mounted state between chromatic diffusing layer 41' and reflective layer 43' such that heat absorbed e.g. with an absorbing material provided at reflective layer 43' (dots 47') can be transferred to the air within chimney system 49' to again initiate an upward air flow 51'. In order to achieve an higher degree of IR capture and consequently a larger heat transfer, the IR absorbing material can be added directly inside the chromatic diffusing layer 41' or it can be added as a film or coating on the reflective layer.

Chromatic diffusing layer 41' may be a panel structure having the diffusing nanoparticles distributed therein. In addition or alternatively, the panel structure may be a NIR transmitting panel where the coating with the diffusing nanoparticles is applied to an outer (front) side 41A' and/or an inner side 41B'. In some embodiments, the panel structure may also provide the absorbing feature in the infrared spectral range.

For various types of panel structures it is referred to the international patent applications PCT/EP2015/001454 and PCT/EP2015/077171, which are incorporated herein by reference. Essential for the positioning of the absorbing material is that it is subject to the incoming light to be able to absorb selectively within the infrared wavelength range.

For example, in an alternative embodiment, a chromatic facade unit comprises—as a support structure—a sandwich of two metal layers (an outer and an inner metal layer with respect to the building) and a polymer as an example of a core layer. Similar to the embodiment of FIG. 2(*b*) the complete sandwich structure may have imprinted a desired surface structure on the outer metal layer on which the chromatic diffusing layer and the absorbing material may be applied (before or after imprinting). In general, imprinting may allow for a small sized structure in comparison of any mechanical bending.

As mentioned above, the chromatic diffusing layer and/or the absorbing material may be a coating or film that has a thickness of, for example, about 0.2 mm or less such as 0.1 mm or less or even 0.05 mm or less. Moreover, the coating or film may be deposited onto the reflecting surface sections prior or after providing a respective shape.

For completeness, in addition to nanoparticles for Rayleigh-like scattering, larger light-scattering centers may be embedded within the chromatic diffusing layer. Those additional light-scattering centers may have an average size larger than Rayleigh-active nanoparticles, for example in the range of 1 μm or more such as larger than about 5 μm. The additional light-scattering centers may provide—in addition to the above discussed Rayleigh-like diffuse scattering by the Rayleigh-active nanoparticles—a blurring effect that effects the specular reflected component to be deviated from the pure specular reflection in a forward "scattering" cone.

As will be apparent to the skilled person, an analogue blurring effect may be generated by providing a micro-roughness e.g. on the chromatic diffusing layer on the illumination side and/or by providing the reflective surface, instead of with a perfectly glossy finishing, with a rough finishing (such as those available in commercial products such as some type of coil-coated high-reflective metal sheets) configured to provide diffusion of reflected light within a cone of about 3° or more such as 5° or more or even 10° or more.

Methods for applying the reflective layer and/or the chromatic diffusing layer include metal vacuum deposition, molecular beam epitaxy, plasma coding, spraying, inkjet methods, film splitting, or the like.

In some embodiments, a metal layer can be used as a reflective layer such as an aluminum metal mirror foil with reflectivity larger than 95% or even larger than 98% in the visible range.

In some embodiment, the facade mounting structure (e.g. mount 35 in FIG. 3) may extend grid wise on the wall of the building. A sequence of chromatic facade units may be mounted to completely or partly cover the wall of the building. The mounting may be performed such that each chromatic facade unit is (slightly) inclined with respect to the wall of the building. For example, the inclination angles associated with respective chromatic facade units/reflective surface sections may be in the range from about 2° to about 80° such as in particular in the range from about 10° to about 40°.

Moreover, the above discussed configurations illustrate the possibility to provide—with respect to a single one of the respective surface sections or with respect to a plurality of reflective surface sections—a constant or varying scattering characteristic, a constant or varying nanoparticle distribution, and/or a constant or varying inclination angle of the reflective surface sections. Those aspects affect the chromatic feature of the chromatic facade units for specific viewing directions.

Figure 5:
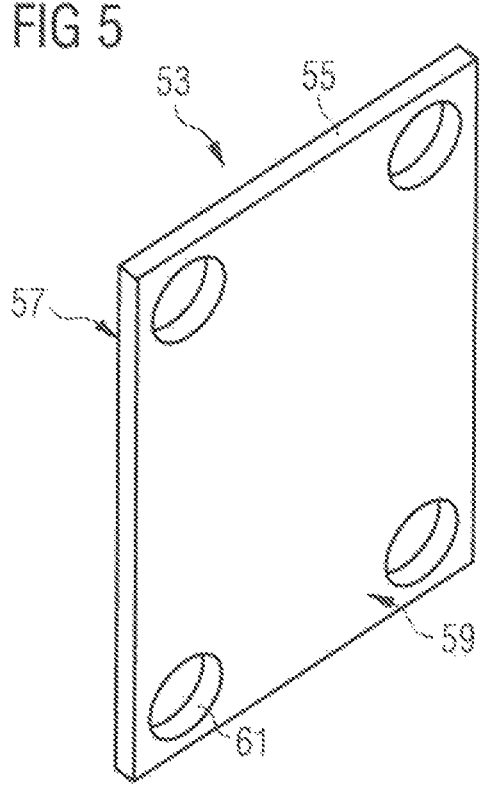
FIG. 5 is a schematic illustration of a glass panel based chromatic facade unit.
Figure 6:
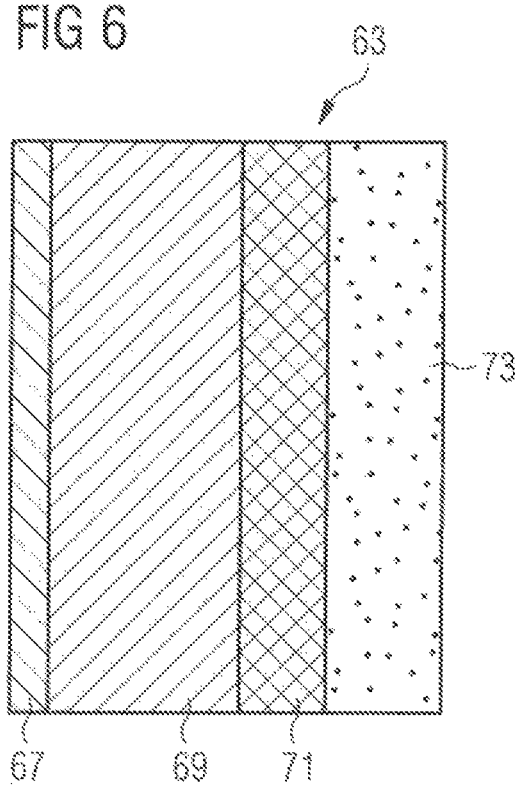
FIG. 6 is a schematic cross-section of a sandwich-structure based chromatic facade unit.

FIGS. 5 and 6 show further exemplary embodiments of chromatic facade units.

FIG. 5 illustrates a glass panel based chromatic facade unit 53. A glass panel 55, for example a safety glass panel, forms the support structure of chromatic facade unit 53. It has a reflective layer 57 applied on one side and a chromatic diffusing layer 59 applied on the other side. The infrared absorbing material may be part of chromatic diffusing layer 59 and/or glass panel 55. In addition or alternatively, infrared absorbing material may be provided between reflective layer 57 and glass panel 55, e.g. as a separate layer. Facade unit 53 may further comprise through holes 61 for attaching the facade unit to a grid configured for mounting a plurality of e.g. identical facade units 53 onto the wall of the building at a desired distance to allow for the convection within the formed channel system.

In alternative embodiments, glass panel 55 may be replaced by a transparent panel made of, for example, a polymeric, e.g. an acrylic, polycarbonate, PVC or the like material. Respective non-glass materials may simplify the mounting and reduce the weight of chromatic facade unit 53 and allow the introduction of e.g. organic absorbing materials.

In FIG. 6, a further alternative configuration of a sandwich structure based facade unit 63 is shown. Facade unit 63 comprises a mount-sided stabilizing layer 67, a core layer 69, and an illumination-sided stabilizing layer 71 thereby forming a composite panel such as an aluminum composite panel that forms a part of the support structure of a chromatic facade unit. Reflective layer sections may be provided by the illumination-sided stabilizing layer itself (e.g. by an aluminum layer) or they may be applied separately thereon by a reflective layer. A chromatic diffusing layer 73 including the absorbing material may be applied onto illumination-sided stabilizing layer 71 or that reflective layer.

Referring to FIG. 7, exemplary absorption spectra for two NIR absorbing medium are illustrated. Specifically, the absorption spectrum shows over the wavelengths of (sun) radiation the percentage of energy absorbed by the absorbing medium, e.g. in % absorbed of the total incoming radiation energy. The amplitude schematically illustrates the absorption for an unsaturated condition. Increasing the amount of absorbing medium to be passed by the incident radiation will increase—as discussed above—the total absorption of the chromatic façade unit. Thus, in principal a large part of the NIR radiation could be removed, however, as will be apparent, the although small effect on the visible spectral portion II may limit the maximum usable concentration of an absorber. The absorption efficiency can be associated with the integral under the absorption spectra.

Absorption spectra 81 smoothly extends over the NIR spectral portion I, having a maximum at about 1200 nm for the main absorption section 81A and extending with a reduced absorption (tail 81B of spectrum) into the visible spectral portion II and the UV spectral portion III. In other words, the absorbing medium may have a maximum of absorption in the near infrared range. As can be seen, tail 81B is essentially constant across the visible spectral portion II thereby having no or only a reduced effect on the chromatic appearance of the chromatic façade unit.

A selective NIR absorber as discussed herein may be defined by the electromagnetic energy in the visible range (e.g. 400 nm to 700 nm) that is absorbed by tail 81B of the absorbing spectrum of the IR absorber provided in the chromatic faØade unit. The absorption spectrum of the IR absorber can show for the absorbing tail 81B in the visible range (e.g. 400-700 nm) an integral value of the absorption profile as a wavelength function evaluated in the visible range that is lower than 30%, preferably lower than 20%, and more preferably lower than 10% of the total integral of the same absorption profile in the wavelength interval of interest for this application (e.g. in the spectral range from 400 nm to 2500 nm).

To be sufficient selective, the electromagnetic energy absorbed by the chromatic façade unit may be lower than 20%, such as lower than 10%, or even lower than 5% of the total electromagnetic energy in the visible spectral range II. At the same time, the absorbed electromagnetic energy in the NIR spectral range may be 70%, such as greater than 80%, or even greater than 90% of the total electromagnetic energy in the NIR spectral range I.

In some embodiments, a desired absorption characteristic may be reached by using two or more absorbing media. For example, a second absorbing medium may be used as shown in FIG. 7 with an exemplary second absorption spectrum 83. Absorption spectra 83 is (with respect to absorption spectra 81) localized in the portion of the NIR spectral portion I next to the visible spectral portion II and thus can provide an increased absorption while less affecting the visible range. In that specific range, also the energy content of the sun radiation is increased as illustrated by the curve 80 increasing from longer wavelength to the visible wavelength with a maximum in the visible spectral range II. In general, an absorption characteristic of the chromatic facade panel may be reached by combining the absorption characteristic of the various involved absorbing media under consideration of their concentrations.

In addition, it may be desired to provide a specific reduced intensity in the visible spectral range that reaches the ground after the reflection at the façade. Accordingly, the combination of absorption media may include an absorbing medium being primarily active in the visible spectral range II and/or an NIR absorbing medium with an increased tail 81B.

In summary regarding the application in façade applications, using the absorption and Rayleigh-like scattering, the chromatic façade unit may provide for a reflectivity in the range from 25% to 100% for the visible spectral portion II (such as about 30%, about 50%/o, about 80%, or about 90%). Without any absorbing medium being active in the visible spectral portion II, the reflectivity may be in the range from at least 80%, such as at least 90% or at least 95% in the visible spectral portion II (corresponding to visible absorption of e.g. 20% or 10% or 5% for the Rayleigh-like scattering particles). Moreover, the chromatic façade unit may provide for a NIR absorption in the range from 50% to 100% for the NIR spectral portion I (such as about at least 70%, about at least 80%, or about at least 90%). The reflectivity and absorption relate to the complete radiation energy content in the respective spectral ranges.

While the forgoing description described the aspects of NR absorption in connection with chromatic (reflective) façade units, hereinafter a transmittive configuration is disclosed exemplarily for a chromatic window unit. Exemplary embodiments include a window of a building or house e.g. exposed to the sun during the day, or a (car) sunroof, pool ceiling windows or similar.

As disclosed in the international patent application PCT/EP2015/077171, entitled "Stratified panel structure for sun-sky-imitating lighting systems" filed on 19 Nov. 2015 by the same applicants, which is incorporated herein by reference, an exemplary configuration of a chromatic window unit structure may comprise, for example, two cover panels. At least one of the two cover panels is configured to provide for the required transmission, i.e. is a transparent panel such as a glass sheet, or, if a desired absorption of sun light in the visible is given, that absorption may be given by one or both panels. It will be appreciated that the panels may, for example in the sun roof embodiments, not be planar but may comprise some curvature depending of the application.

An adhesive transparent polymeric layer may be sandwiched between two inner faces of the two cover panels. At least one nanoparticle-based Rayleigh-like diffusing coating and/or a coating comprising the absorbing medium 47 (NIR absorbing coating) may be applied to, for example, one of the inner face of at least one of the two cover panels. Alternatively or additionally, nanoparticle-based Rayleigh-like diffusing coating and/or a NIR absorbing coating may be applied to a face of adhesive transparent polymeric layer that prior formation of stratified panel structure is a self-supporting structure and, thus, can act, for example, as a support material for a coating/the coating. The coating(s), therefore, may form an interlayer between one of the cover panels and adhesive transparent polymeric layer. In brief, a multi-layer system with the Rayleigh-like diffusing coating/paint is disclosed where the coating/paint is protected inside the stratified e.g. glass structure.

Similarly, the nanoparticles for Rayleigh-like diffusing of incident light and/or a the absorbing medium may be incorporated layer-like in a matrix of a panel-like structure, such as one of the cover panels or a single self-supporting panel.

Figure 4:
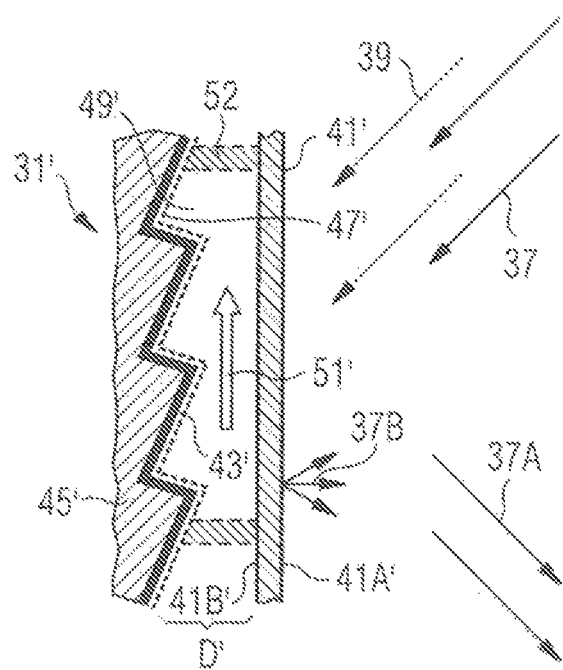
FIG. 4 is a further schematic cross-sections of an exemplary chromatic facade unit.

Before describing further details and embodiments of chromatic window units, exemplary sun-sky-imitation effects are described for the transmission configuration, i.e. using a chromatic diffuser in transmission mode with/or without a separately provided reflective layer (e.g. referring to FIG. 4, chromatic diffusing layer 41' with or without support structure 45').

Figure 8:
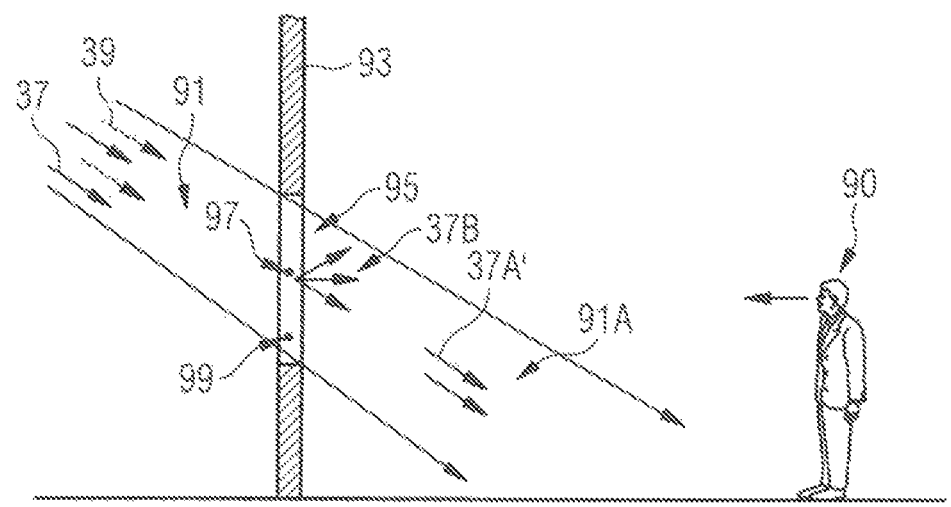
FIG. 8 an illustration of an chromatic window application.

Referring to FIG. 8, an external light source, usually the sun, emits light that is incident on in light beam 91-like manner, i.e. propagating along a main light beam direction. The external light source emits, for example, generally light in the visible spectral region II of the sun light spectrum, for example, with wavelengths between 400 nm and 700 nm (rays 37) and may include radiation emitted in the NIR spectral region I (rays 39) as well as UV light II.

Positioned at a wall 93, a chromatic window unit 95 may comprise a diffused light generator based on nanoparticles 97 as discussed above that operates as a Rayleigh-like diffuser and an absorbing medium 99 e.g. layer-like provided across the window. While nanoparticles 97 may substantially not absorb light in the visible range, absorbing medium 99 is specifically configured to absorb either selectively in the NIR. However, the limitation discussed above for the façade application with respect to the absorption of visible light is reduced as a specific visible light absorption may also be desired.

Nanoparticles 97 are configured to diffuse more efficiently the short-wavelength in respect to the long-wavelength components of the impinging light, e.g. a panel which substantially does not absorb light in the visible range and which diffuses light at the wavelength 450 nm (blue) at least 1.2 times, for example at least 1.4 times, such as at least 1.6 times more efficiently than light in the wavelength range around 650 nm (red), wherein a diffusion efficiency is given by the ratio between the diffused light radiant power with respect the impinging light radiant power. Optical properties and microscopic characteristic of Rayleigh like diffusers are also described in detail in the patent application EP 2 304 478 A1 mentioned above. A further insight on the microscopic features is also provided in what follows.

Chromatic window unit 95 separates the incident light 95 of e.g. the sun in four components, particularly in:

a transmitted (directed non-diffuse) component (light beam 91A), formed by light rays that pass through and do not experience significant deviations, e.g. is formed by light rays experiencing a deviation smaller than 0.1; a luminous flux of the transmitted component is a significant fraction of the overall luminous flux incident on the chromatic diffusing layer:

a forward diffuse component 37B, formed by scattered light propagating into the room behind the window (with the exception of that light beam direction and of directions differing from that light beam direction by an angle smaller than 0.1°); a luminous flux of the forward diffuse component corresponds to a blue skylight fraction generated from the overall luminous flux incident on the chromatic diffusing layer:

a backward diffuse component (not explicitly indicated), formed by scattered light propagating backward into the outer ambient environment; a luminous flux of the backward diffuse component is, in general, in the range of but preferably less than the blue skylight fraction; and a reflected component (not explicitly indicated), formed by reflected light and propagating along a direction at a mirror angle, a luminous flux of the reflected component depends, for example, on the incident angle of the light beam onto the respective surface of chromatic window unit 95.

That having being stated, the optical properties of chromatic window unit 95 are such that the blue skylight fraction may within the range from 5% to 50%, such within the range from 7% to 40%, or even in the range from 10% to 30%, or within the range from 15% to 20%;

the average CCT of the forward diffuse component is significantly higher than the average correlated color temperature CCT of the transmitted component, for example it may be higher by a factor of 1.2, or 1.3, or 1.5 or more;

chromatic window unit 95 may not or up to a desired extent absorb incident light, namely the sum of the four components is at least equal to 80%, or 90%, or even 95%, or 97% or more (no absorption) or less than 80% such as less than 80%, depending on the amount of darkening desired, e.g. down to 40% or 50%:

chromatic diffusing layers may scatter mostly forward, namely more than 1.1, or 1.3, or eve 1.5, or 2 two times more than is back scattered; and chromatic diffusing layer may have low reflection, namely less than a portion of 9%, or 6%, or even less than 3%, or 2% of the impinging light is reflected.

As it is apparent to the skilled person, depending on the specific interaction of the chromatic diffusing layer with the light beam 91, the color and/or CCT of light beam 91A may be affected. Depending from the type of nanoparticles and their concentration as well as the NIR absorber, the CCT difference may be, for example, at least 300 K or even 1 000 K or more.

Looking from within the building onto chromatic window unit 95, an observer 90 may have an optical perception governed by the compination of the various light components that reach his eye. Within transmitted beam 91A, the light spectrum of the sun having removed therefrom the scattered and the absorbed portions. Within as well as outside beam 91A, observer 90 will see the scattered light as well as any other light passing through the window from the outside.

In general, the absorber reduces the luminance of the window for observer 90, while the extent of provided chromatic diffusing activity will affect the perceived color. On the one side, transmitted beam 95 is spectrally shifted to the red, but the complete scattering will provide some blue-shift. The scattering may further increase the perceived luminance outside the beam.

Referring again to the optical parameters of the chromatic window unit, similarities will be apparent to the reflective mode of the chromatic façade unit. For completeness, a brief discussion of optical aspects will indicate the similarities and differences to the skilled reader.

Diameter, refractive index mismatch and areal density (number per square meter) of the nanoparticles are the parameters that define the cross section of the scattering phenomenon in the chromatic window and façade units. In addition, the amount of the impinging light scattered from the chromatic window and façade units increases by increasing one of the parameters mentioned above. In order to simplify the description for the transmission mode, we can consider just the regular transmittance property $T(\lambda)$ of the material at a certain wavelength. Herein, as defined in the Standard Terminology of Appearance, ASTM international, E 284-09a, the transmittance is in general the ratio of the transmitted flux to the incident flux in the given conditions. The regular transmittance $T(\lambda)$ is the transmittance under the undiffused angle, i.e. the angle of incidence. In the context of the present disclosure, for a given wavelength and a given position on the chromatic diffusing layer, the regular transmittance is intended for non-polarized incident light with an incident angle corresponding to the main light beam propagation.

Regarding the transmission configurations, the regular transmittance for the blue T[450 nm] may be in general within the range [0.05-0.9]. In particular in some embodiments aiming at a pure clear sky perception the range would be [0.3-0.9], such as [0.35-0.851 or even [0.4-0.8]; in the embodiments aiming at a Nordic sky the range would be [0.05-0.3], such as [0.1-0.3] or even 10.15-0.3]. In general, the transmittance measurement is a feasible way to evaluate the optical properties of the window and façade units.

Considering reflection configuration, the nano-loaded scattering coating is crossed twice by an impinging light (due to the presence of the mirror), in order to obtain comparable transmittance data with respect to the transmission configuration, the mirror coating has to be removed.

The chromatic effect is further based on nanoparticles having a refractive index that is different than the refractive index of the embedding matrix and the number of nanoparticles per unit area as discussed above. In general, similar or the same values for those optical features may be used in transmission and reflection mode, i.e. in chromatic façade and window units. Specifically, the factors summarized in the above table may be applied as upper or lower limit, including that value or excluding that value respectively in the term $$\frac{\text{factor}}{D^6}\left|\frac{m^2+2}{m^2-1}\right|^2$$

also for the chromatic window unit, for example.

The chromatic window may further be applicable in lighting systems that e.g. use light sources with unwanted heating by an infrared radiation tail.

Thus, in general a chromatic window panel with an absorbing medium in the visible allows to further adapt the chromatic appearance and/or an absorbing medium in the NIR allows to remove radiation heat while still maintaining an optical appearance effect.

Assuming looking through/at the window unit, the perceived transmitted (sky) light will be attenuated. However, the nanoparticle based scattering may be able to recover direct light to provide cool (blue) light to light up the appearance. Thus, besides the reduced luminance, the blue shift from the particles may light up the window and may intensify the sky color, thereby compensating kind of for the attenuation.

In other words, the attenuation of the absorbing (e.g. brown looking) glass reduces the glare and thus the luminance. The Rayleigh-like scattering contributes blue to the appearance and in combination with the presence of the absorbing medium (e.g. active in the visible and infrared) may result in the desired appearance with reduced radiation heat input.

In general, the herein used absorbing medium may be presented as an optically continuously over the area acting layer or it may be a localized distribution that does not absorb at any areal portion of the chromatic façade unit or the chromatic window unit. For example, it may be a coating or a layer-like acting distribution within a matrix.

In some embodiments, said nanoparticles have an average size d in the range 10 nm≤d≤240 nm In some embodiments, the ratio between the blue and red scattering optical densities Log[R(450 nm)]/Log[R(630 nm)] of the chromatic facade unit falls in the range 5≤γ≥2.5, where R(λ) is the monochromatic normalized specular reflectance of the chromatic reflective unit, which is the ratio between the specular reflectance of the chromatic reflective unit and the specular reflectance of a reference sample identical to the chromatic reflective unit except for the fact that the chromatic diffusing layer does not contain nanoparticles with the size d in the range 10 nm≤d≤240 nm In some embodiments, along the direction normal to the reflective layer/chromatic façade unit or the window like unit, the number N of nanoparticles per unit area is given by $$N \geq N_{min} = \frac{2.07\times 10^{-29}}{D^6}\left|\frac{m^2+2}{m^2-1}\right|^2 \text{ [meters-2] and } N \leq N_{max} =$$

$$\frac{1.21\times 10^{-27}}{D^6}\left|\frac{m^2+2}{m^2-1}\right|^2 \text{ [meters-2]},$$

D being the effective particle diameter given in meters.

Although the preferred embodiments of this invention have been described herein, improvements and modifications may be incorporated without departing from the scope of the following claims.

The invention claimed is:

1. A chromatic facade unit configured to be attached to a wall of a building to form a facade of the wall, the chromatic facade unit comprising:
   a support structure;
   a chromatic reflective layer formed on the support structure, the chromatic reflective layer comprising a reflective layer and a chromatic diffusing layer, wherein the chromatic diffusing layer is configured to provide a specular reflectance of the chromatic reflective layer that is larger in the red than in the blue and a diffuse reflectance of the chromatic reflective layer that is larger in the blue than in the red, and the reflective layer is configured to reflect visible light having passed through the chromatic diffusing layer; and
   an absorbing medium provided in or on the chromatic diffusing layer and/or the reflective layer, wherein the absorbing medium is configured to absorb radiation in the infrared spectrum.

2. The chromatic facade unit of claim 1, further configured to provide, in the mounted state, a part of a chimney system for allowing an air flow when radiation is absorbed in the infrared spectrum, and respective absorption heat is transferred to air within the part of the chimney system.

3. The chromatic facade unit of claim 1, further comprising:
   mounts for mounting the chromatic diffusing layer at a distance (D') from the support structure, thereby forming the part of the chimney system within the chromatic facade unit for allowing an air flow through the chromatic facade unit.

4. The chromatic facade unit of claim 1, wherein at least one of:
   the reflective layer is configured to reflect at least 70%, at least 95%, or at least 98% of light in the visible spectral range;
   the chromatic diffusing layer is configured to diffuse at the most 30% of light in the visible wavelength spectrum;
   the absorbing medium is selected to have an absorption peak in the near infrared spectral range and a reduced absorption in the visible spectral range with respect to the near infrared spectral range; and
   the concentration of the absorbing medium is selected to absorb at least 70% of radiation in the near infrared wavelength spectrum and to transmit at least 25% of light in the visible spectral range.

5. The chromatic facade unit of claim 1, wherein
   the reflective layer comprises a metal layer, an aluminum metal mirror foil, or a metal coating;
   the chromatic diffusing layer comprises a plurality of scatterers acting nanoparticles embedded in a transparent matrix; and
   the absorbing medium comprises at least one of an organic compound an organic conjugated or donor acceptor system, a metal complex, an inorganic metal based oxide, a Tungsten based oxide, a Nickel based oxide, and an Iridium based oxide.

6. A chromatic facade structural unit comprising:
   a chromatic facade unit of claim 1; and
   a mounting system configured for mounting the chromatic facade unit to the wall such that the chromatic facade unit extends vertically at a distance (D) along the wall, thereby forming the chimney system extending vertically between the wall and the chromatic facade unit.

7. A chromatic facade unit for attaching to a wall of a building, the chromatic facade unit comprising:
a support structure,
a reflective layer formed on the support structure, and
a chromatic diffusing layer having a back side provided at the reflective layer and a front side configured to be illuminated by incident light, wherein the chromatic diffusing layer comprises a plurality of nanoparticles embedded in a matrix, and is configured to provide a specular reflectance of the chromatic facade unit that is larger in the red than in the blue and a diffuse reflectance of the chromatic facade unit that is larger in the blue than in the red, wherein
at least one of the chromatic diffusing layer and the reflective layer further comprises particles contributing to absorption of a spectral range in the infrared spectrum.

8. The chromatic facade unit of claim 1, wherein the support structure is configured as the chromatic diffusing layer.

9. The chromatic facade unit of claim 1, wherein at least one of:
the reflective layer continuously extends on the support structure, and is in particular directly applied on and structurally directly connected to the support structure;
the reflective layer is a continuous metal layer;
the reflective layer has a thickness providing for a reflectivity of at least 65% or at least 75% or at least 85% for light having passed through the chromatic diffusing layer; and
the reflective layer is formed by a surface portion of the support structure.

10. The chromatic facade unit of claim 1, wherein the chromatic facade unit is configured as a sandwich structure that comprises a sequence of sections providing reflective surface sections; or
wherein a plurality of non-coplanar reflective surface sections is imprinted onto the support structure.

11. The chromatic facade unit of claim 1, wherein the chromatic diffusing layer is in contact with the reflective layer.

12. The chromatic facade unit of claim 1, wherein a difference in the refractive index of the nanoparticles with respect to the refractive index of the matrix, a size distribution of the nanoparticles, and a number of nanoparticles per unit surface area are selected to provide for the specular reflectance that is larger in the red than in the blue and for the diffuse reflectance that is larger in the blue than in the red, and
wherein the differences in the specular reflectance and the diffuse reflectance are given as average values with respect to a blue portion and a red portion in the visible light spectrum.

13. The chromatic facade unit of claim 1, wherein the nanoparticles contributing to the differences in the specular reflectance and the diffuse reflectance and the matrix are essentially non-absorbing.

14. The chromatic facade unit of claim 1, wherein the relative refraction index $$m \equiv \frac{n_p}{n_h},$$

where $n_p$ is the refractive index of the nanoparticles and $n_h$ is the refractive index of the matrix, is in the range $0.5 \leq m \leq 2.7$, and
for m being in the range $0.7 \leq m \leq 2.1$, an effective particle diameter, $D = dn_h$, fulfills
$D[nm] \leq 132m + 115$ if $0.7 \leq m < 1$;
$D[nm] \leq 240$ if $1 < m < 1.35$; and
$D[nm] \leq -135m + 507$ if $1.35 \leq m \leq 2.1$.

15. The chromatic facade unit of claim 1, wherein along a thickness propagation direction through the chromatic diffusing layer, the number of nanoparticles per unit area is $$N \leq N_{max} = \frac{3.7 \times 10^{-28}}{D^6} \left| \frac{m^2 + 2}{m^2 - 1} \right|^2 \ [\text{meters}^{-2}],$$

D being given in meters,
wherein a maximum filling fraction is $f \leq 0.4$ or $f \leq 10^{-2}$.

16. The chromatic facade unit of claim 1, wherein the chromatic diffusing layer further comprises at least one of:
particles contributing to absorption of a limited spectral range in the ultraviolet spectrum and/or in a specific visible spectral range for superimposing a coloring to the appearance of the chromatic facade unit; and
particles having a size such that the particles contribute to an increase forward scattering, thereby decreasing the specular reflectance, and wherein the specular reflectance is decreased essentially independent of the color.

17. The chromatic facade unit of claim 1, wherein the support structure is configured as a continuous coarse grain surface comprising a plurality of mosaic-like surface structures providing a plurality of surface sections.

18. A chromatic window unit for integration in a wall of a building or mounting onto a reflective facade portion of a building, for being exposed to outside light such as sun light, the chromatic window unit comprising:
a support structure;
a chromatic diffusing layer, wherein the chromatic diffusing layer is based on nanoparticles which preferentially scatter short-wavelength components of incident light with respect to long-wavelength components of incident light; and
an absorbing medium provided in or on the chromatic diffusing layer, wherein the absorbing medium is configured to absorb radiation in the infrared spectrum and/or the visible spectrum.

19. The chromatic window unit of claim 18, further configured to be mounted at a distance to a reflective layer to provide, in the mounted state, a part of a chimney system for allowing an air flow when radiation is absorbed in the infrared spectrum, and respective absorption heat is transferred to air within the part of the chimney system.

20. The chromatic window unit of claim 18, wherein
the chromatic diffusing layer is configured to diffuse at the most 30% of light in the visible wavelength spectrum; or
the chromatic diffusing layer comprises a plurality of scatterers acting nanoparticles embedded in a matrix.

21. The chromatic window unit of claim 18, wherein the absorbing medium is selected to have an absorption peak in the near infrared spectral range and a reduced absorption in the visible spectral range with respect to the near infrared spectral range; or
the absorbing medium comprises at least one of an organic compound, an organic conjugated or donor acceptor system, a metal complex, an inorganic metal based oxide, a Tungsten based oxide, a Nickel based oxide, and a Iridium based oxide.

22. The chromatic window unit of claim 18, wherein the concentration of the absorbing medium and/or its absorption characteristic are selected to absorb at least 20% of radiation in the near infrared wavelength spectrum; or
the concentration of the absorbing medium and/or its absorption characteristic are selected to absorb at least 20% of radiation in the visible spectral range.

23. The chromatic window unit of claim 18, wherein the support structure is configured as the chromatic diffusing layer; or
wherein the chromatic diffusing layer has a thickness of up to about 1 mm or about 2 mm and/or is a self-supporting structure; or
wherein the chromatic window unit is configured as a sandwich structure.

24. The chromatic window unit of claim 18, wherein the relative refraction index $$m \equiv \frac{n_p}{n_h},$$

where $n_p$ is the refractive index of the nanoparticles and $n_h$ is the refractive index of the matrix, is in the range $0.5 \leq m \leq 2.7$, and
form being in the range $0.7 \leq m \leq 2.1$, an effective particle diameter, $D \equiv d n_h$, fulfills
$D[nm] \leq 132m + 115$ if $0.7 \leq m < 1$;
$D[nm] \leq 240$ if $1 < m < 1.35$; and
$D[nm] \leq -135m + 507$ if $1.35 \leq m \leq 2.1$.

25. The chromatic window unit of claim 18, wherein along a thickness propagation direction through the chromatic diffusing layer, the number of nanoparticles per unit area is $$N \leq N_{max} = \frac{3.7 \times 10^{-28}}{D^6} \left| \frac{m^2 + 2}{m^2 - 1} \right|^2 \ [\text{meters}^{-2}],$$

D being given in meters,
wherein a maximum filling fraction is $f \leq 0.4$ or $f \leq 10^{-2}$.

26. The chromatic window unit of claim 18, wherein the chromatic diffusing layer and/or a the absorbing medium is a matrix based layer, a coating, a paint, or a bulk material or the chromatic diffusing layer and/or the absorbing medium is incorporated in a matrix of a panel-like structure, a cover panel of a sandwich structure, or a single self-supporting panel structure.

27. The chromatic window unit of claim 18, wherein the chromatic diffusing layer further comprises at least one of
particles contributing to absorption of a limited spectral range in the ultraviolet spectrum and/or in a specific visible spectral range for superimposing a coloring to the appearance of the chromatic facade unit; or
particles having a size such that the particles contribute to an increase forward scattering, thereby decreasing the specular reflectance, and wherein the specular reflectance is decreased essentially independent of the color.

28. The chromatic window unit of claim 18, wherein the support structure is configured as a continuous coarse grain surface comprising a plurality of surface structures providing a plurality of surface sections.

29. The chromatic window unit of claim 18, wherein the preferential scattering relates to light having a wavelength spectrum extending in the visible spectrum over at least 150 nm;
wherein the chromatic diffusing layer comprises light-scattering centers of an average size smaller than 250 nm;
wherein the number N of nanoparticles, which preferentially scatter short-wavelength components of incident light with respect to long-wavelength components of incident light, per unit area of the chromatic diffusive layer depends on an effective particle diameter $D = dn_h$, is within the range defined by $$N \geq N_{min} = \frac{2.07 \times 10^{-29}}{D^6} \left| \frac{m^2 + 2}{m^2 - 1} \right|^2 \ [\text{meters}^{-2}],$$

(D given in [meters]) and $$N \leq N_{max} = \frac{1.21 \times 10^{-27}}{D^6} \left| \frac{m^2 + 2}{m^2 - 1} \right|^2 \ [\text{meters}^{-2}].$$

* * * * *